United States Patent
Combes et al.

(10) Patent No.: US 12,497,181 B2
(45) Date of Patent: Dec. 16, 2025

(54) ASSEMBLY OF A LONGITUDINAL MEMBER OF A WING AND AN ENGINE PYLON WHICH ARE HORIZONTALLY ALIGNED RELATIVE TO ONE ANOTHER

(71) Applicant: Airbus Operations SAS, Toulouse (FR)

(72) Inventors: Pierre-Antoine Combes, Toulouse (FR); Marc De Nicola, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/819,000

(22) Filed: Aug. 29, 2024

(65) Prior Publication Data

US 2025/0074611 A1    Mar. 6, 2025

(30) Foreign Application Priority Data

Aug. 31, 2023    (FR) ..................................... 2309134

(51) Int. Cl.
    B64D 27/40    (2024.01)
(52) U.S. Cl.
    CPC .................. B64D 27/402 (2024.01)
(58) Field of Classification Search
    CPC ...... B64D 27/40; B64D 27/402; B64D 27/18; B64D 27/12; B64D 27/404; B64D 29/06; B64C 3/32
    See application file for complete search history.

(56) References Cited

U.S. PATENT DOCUMENTS

| | | | |
|---|---|---|---|
| 7,780,113 B1 * | 8/2010 | Lafont | B64D 27/18 244/54 |
| 10,583,930 B2 | 3/2020 | West | |
| 2004/0129832 A1 | 7/2004 | Marche | |
| 2010/0193627 A1 | 8/2010 | Lafont | |
| 2010/0314491 A1 | 12/2010 | Forbes | |
| 2016/0229545 A1 | 8/2016 | Pautis et al. | |
| 2018/0178923 A1 * | 6/2018 | Petrissans-Lloveras | B64D 27/40 |

FOREIGN PATENT DOCUMENTS

| | | |
|---|---|---|
| FR | 2836672 A1 | 9/2003 |
| FR | 2891247 A1 | 3/2007 |
| FR | 3032421 A1 | 8/2016 |
| FR | 3118944 A1 | 7/2022 |

OTHER PUBLICATIONS

French Search Report for corresponding French Patent Application No. 2309134 dated Feb. 7, 2024.

* cited by examiner

*Primary Examiner* — Arfan Y. Sinaki
(74) *Attorney, Agent, or Firm* — Greer, Burns & Crain, Ltd.

(57) ABSTRACT

An assembly comprising a longitudinal member of an aircraft wing, where the longitudinal member has a contact wall which is penetrated by first bores, each passing through the contact wall parallel to a longitudinal direction, an engine pylon which is arranged at the end of the longitudinal member in the longitudinal direction and having an upper longitudinal member which, for each first bore, is penetrated by a second bore which is aligned with the first bore, and a nut and a screw for each pair of a first bore and a second bore, which are aligned, where the screw is screwed into the nut successively via the first bore and the second bore, sandwiching the upper longitudinal member and the contact wall.

8 Claims, 3 Drawing Sheets

ASSEMBLY OF A LONGITUDINAL MEMBER OF A WING AND AN ENGINE PYLON WHICH ARE HORIZONTALLY ALIGNED RELATIVE TO ONE ANOTHER

CROSS-REFERENCES TO RELATED APPLICATIONS

This application claims the benefit of French Patent Application Number 2309134 filed on Aug. 31, 2023, the entire disclosure of which is incorporated herein by way of reference.

FIELD OF THE INVENTION

The present invention relates to an assembly of a longitudinal member of an aircraft wing with an engine pylon which are horizontally aligned with one another and where the fixing is provided by horizontal screw-nut systems. The present invention also relates to an aircraft comprising such an assembly.

BACKGROUND OF THE INVENTION

An aircraft conventionally comprises at least one engine, in particular a turbojet engine. The aircraft comprises an engine pylon below each wing and for each engine, said engine pylon being fixed to the structure of the wing and the engine being suspended below the engine pylon.

Conventionally, the engine pylon is arranged below the wing and is fixed thereto by various fixing means.

In order to gain efficiency, engines are becoming increasingly large and the positioning of the engine pylon below the wing limits the possibilities for increasing the size, since the engine has to maintain a minimum distance relative to the ground.

It is thus desirable to find a novel arrangement which makes it possible to gain space in the region of the joint between the engine pylon and the wing, in order to lift up the engine.

SUMMARY OF THE INVENTION

A subject of the present invention is to propose an assembly of a longitudinal member of an aircraft wing with an engine pylon which provides a reduction in the height of the assembly. To this end, an assembly for an aircraft comprising a wing is proposed, said assembly comprising:
- a longitudinal member of the wing, where the longitudinal member has a contact wall which is penetrated by a plurality of first bores, each passing through the contact wall and parallel to a longitudinal direction perpendicular to the contact wall,
- an engine pylon which is arranged at the end of the longitudinal member in the longitudinal direction and having an upper longitudinal member which is generally perpendicular to the contact wall and which is penetrated, for each first bore, by a second bore which is parallel to the longitudinal direction and aligned with the first bore, and
- a nut and a screw for each pair of a first bore and a second bore which are aligned, where the screw is screwed into the nut successively via the first bore and the second bore, sandwiching the upper longitudinal member and the contact wall.

Such an assembly makes it possible to reduce the height of the assembly and the horizontal orientation of the screw-nut systems ensures that it works only under tension.

Advantageously, the engine pylon comprises a lateral wall on either side of the upper longitudinal member, and the assembly comprises two shear pins, one thereof being inserted into a first hole of the contact wall and a second hole of a lateral wall, and the other thereof being inserted into a first hole of the contact wall and a second hole of the other lateral wall.

Advantageously, the shear pins are mounted so as to be tightened in the corresponding holes and the screws are mounted with clearance in the corresponding bores.

Advantageously, the assembly comprises an intermediate wall which is arranged between the contact wall and the upper longitudinal member and, for each screw, the intermediate wall is passed through by an intermediate bore which is passed through by the screw and, when shear pins are present, for each shear pin the intermediate wall is passed through by an intermediate hole which is passed through by the shear pin.

Advantageously, the upper longitudinal member is penetrated by at least one third bore which is perpendicular to the longitudinal direction in which the second bore opens out, and the nut is a barrel nut housed in the third bore.

The invention further proposes an aircraft comprising a wing and an assembly according to one of the preceding variants.

BRIEF DESCRIPTION OF THE DRAWINGS

The features of the invention which are mentioned above, in addition to others, will become more apparent from reading the following description of an exemplary embodiment, said description being made in relation to the accompanying drawings, in which.

DETAILED DESCRIPTION OF THE PREFERRED EMBODIMENTS

Figure 1:
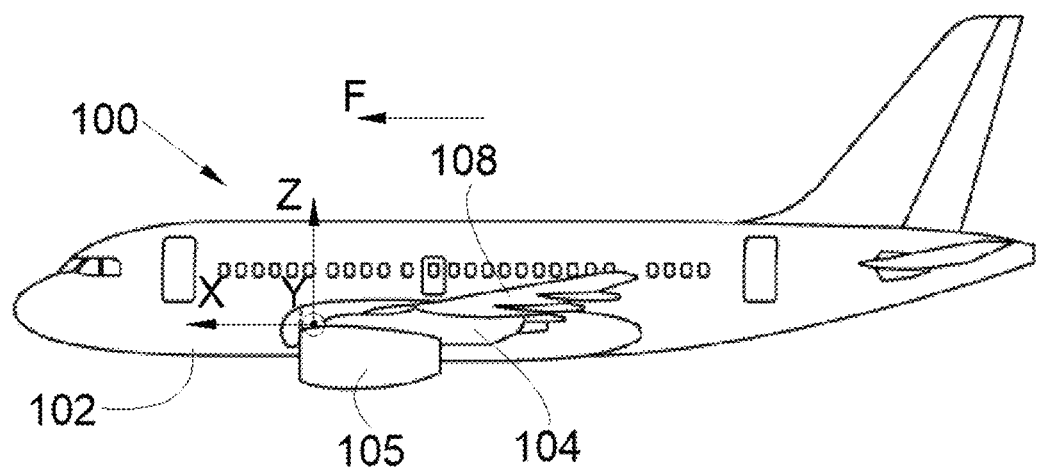
FIG. 1 is a side view of an aircraft according to the invention.

In the following description, terms which relate to a position are taken to refer to an aircraft in the position of forward travel, i.e. as shown in FIG. 1 where the arrow F represents the direction of forward travel.

FIG. 1 shows an aircraft 100 which has a fuselage 102, a wing 108 being arranged on either side thereof and an engine 105, in particular a turbojet engine, being fixed there below by means of a engine pylon 104 which in turn is fixed to the wing 108.

In the following description and for the sake of convention, X refers to the longitudinal direction of the engine pylon 104 oriented positively in the direction of forward travel of the aircraft 100 and generally parallel to the longitudinal axis of the aircraft 100, Y refers to the transverse direction of the engine pylon 104 which is horizontal when the aircraft 100 is on the ground, and Z refers to the vertical direction or vertical height when the aircraft 100 is on the ground, these three directions X, Y and Z being at right-angles to one another.

In the embodiment of the invention shown in FIG. 1, the aircraft 100 comprises an engine 105 below each wing 108 of the aircraft 100, but it is possible to provide a plurality of engines 105 below each wing 108.

The wing 108 comprises, amongst other things, longitudinal members 106 which extend parallel to the longitudinal direction X. The longitudinal member 106 of the wing 108 has a contact wall 106*a* which extends in a plane generally perpendicular to the longitudinal direction X.

Figure 2:
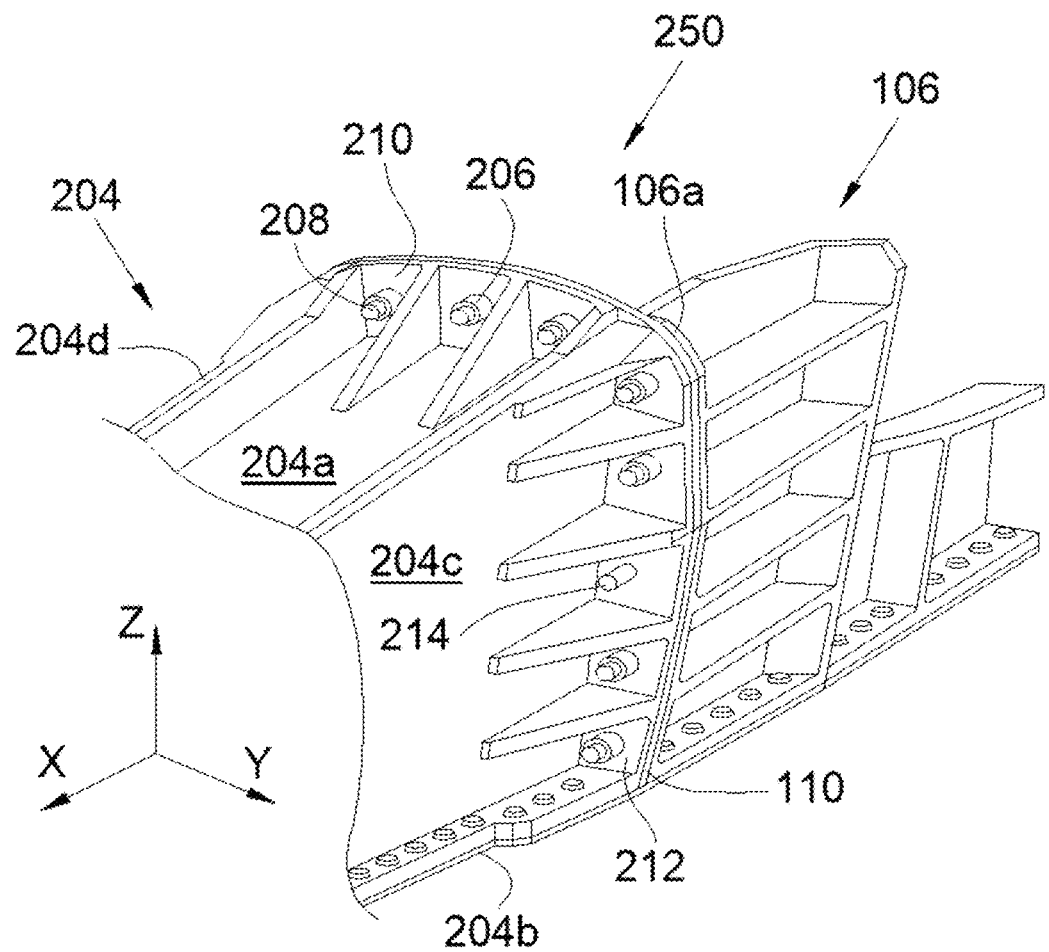
FIG. 2 is a perspective view of an assembly according to a first embodiment of the invention.
Figure 3:
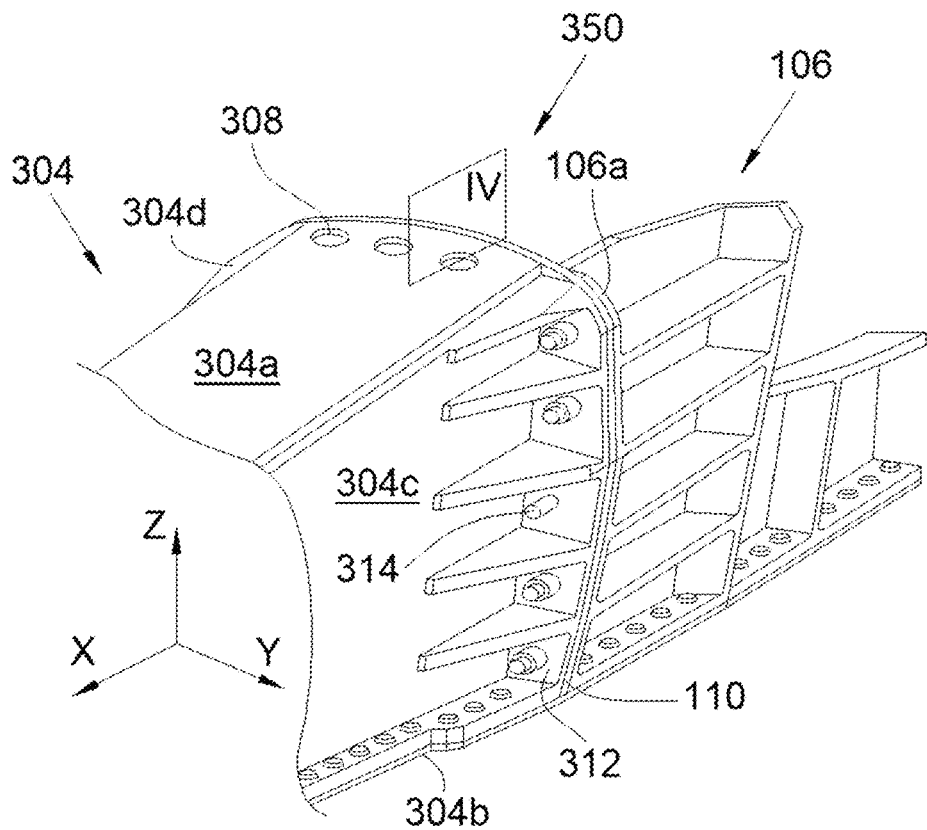
FIG. 3 is a perspective view of an assembly according to a second embodiment of the invention.
Figure 4:
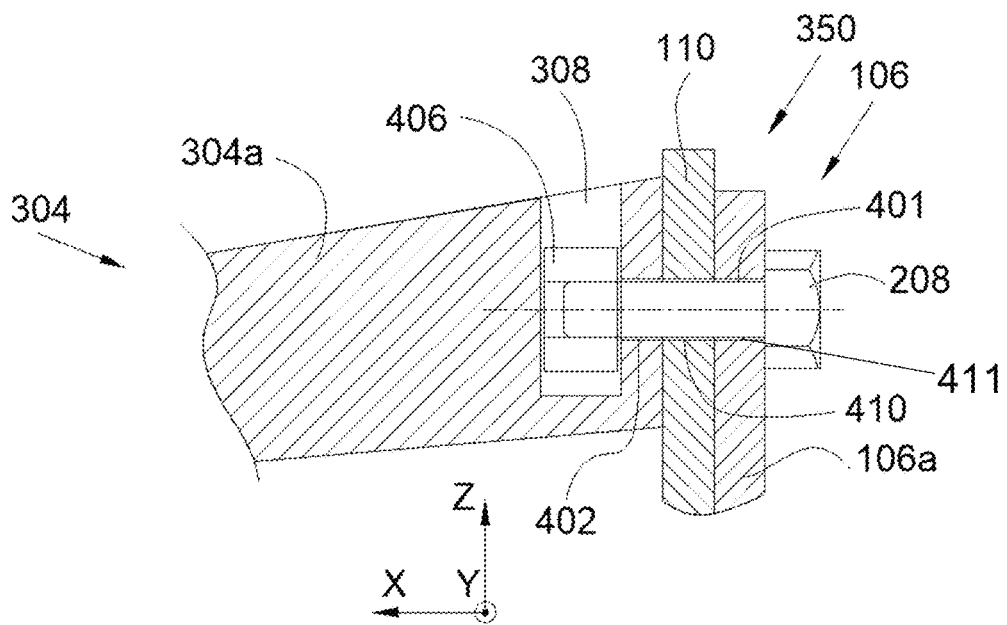
FIG. 4 is a sectional view along the plane IV of the assembly of FIG. 3.

FIG. 2 shows a first embodiment of an assembly 250 between a longitudinal member 106 of the wing 108 and the engine pylon 204 and FIGS. 3 and 4 show a second embodiment of an assembly 350 between a longitudinal member 106 of the wing 108 and the engine pylon 304. The difference between the first embodiment and the second embodiment is in the shape of the upper longitudinal member 204*a*, 304*a* of the engine pylon 204, 304 and the fixing thereof to the longitudinal member 106 of the wing 108.

The engine pylon 204, 304 takes the form of a box which in this case comprises an upper longitudinal member 204*a*, 304*a*, a lower longitudinal member 204*b*, 304*b* and two lateral walls 204*c-d*, 304*c-d*. The various walls and the longitudinal members are fixed to one another so as to form a box, the vertical section thereof being generally trapezoidal. Each longitudinal member 204*a-b*, 304*a-b* and each lateral wall 204*c-d*, 304*c-d* extend in a plane which is generally parallel to the longitudinal direction X, i.e. generally perpendicular to the contact wall 106*a*. The engine pylon 204, 304 is generally symmetrical relative to a vertical median plane XZ.

The lateral walls 204*c-d*, 304*c-d* are arranged on either side of the upper longitudinal member 204*a*, 304*a*.

The contact wall 106*a* is penetrated by a plurality of first bores 401 where each bore passes through the contact wall 106*a* and is parallel to the longitudinal direction X, i.e. perpendicular to the contact wall 106*a*.

The engine pylon 204, 304 is arranged at the end of the longitudinal member 106 of the wing 108, in the longitudinal direction X, i.e. in the extension of one another in the longitudinal direction X. The engine pylon 204, 304 thus extends the longitudinal member 106 of the wing 108 in the longitudinal direction X.

For each first bore 401, the upper longitudinal member 204*a*, 304*a* is penetrated by a second bore 402 which is also parallel to the longitudinal direction X and aligned with the first bore 401 in the assembled position.

In the first embodiment of the invention, the second bore 402 is produced in an angle piece 210 of the upper longitudinal member 204*a*, where the angle piece 210 is parallel to the contact wall 106*a*.

In the second embodiment of the invention, the second bore 402 is produced from a third bore 308 which is produced in the upper longitudinal member 304*a* perpendicular to the longitudinal direction X. The second bore 402 thus opens out into the third bore 308.

The third bore 308 opens out in the region of an upper face of the upper longitudinal member 304*a* and is preferably blind.

In the same manner, the lateral walls 204*c-d*, 304*c-d* comprise angle pieces 212, 312 which are parallel to the contact wall 106*a* and which are also passed through by second bores aligned with first bores of the contact wall 106*a* parallel to the longitudinal direction X.

The fixing of the engine pylon 204, 304 to the longitudinal member 106 of the wing 108 is provided by screw-nut systems. Thus the assembly 250, 350 comprises a nut 206, 406 and a screw 208 for each pair of a first bore 401 and a second bore 402 which are aligned. The screw 208 is screwed into the nut 206, 406 successively through the first bore 401 of the contact wall 106*a* and the second bore 402 of the upper longitudinal member 204*a*, 304*a*, sandwiching the upper longitudinal member 204*a*, 304*a* and the contact wall 106*a* between the head of the screw 208 and the nut 206, 406.

With such an arrangement, the height of the assembly is reduced due to the alignment of the longitudinal member 106 of the wing 108 and of the engine pylon 204, 304 and due to its orientation parallel to the longitudinal direction X, and each screw-nut system works solely in tension, taking up the axial forces in the longitudinal direction X, such as thrust. The joint between the engine pylon 204, 304 and the longitudinal member 106 of the wing 108 is thus implemented on a single interface plane, i.e. the plane of the contact wall 106*a* where the screw-nut systems are arranged so as to transmit the forces generated by the engine 105 to the wing 108, while guaranteeing that the joint does not separate.

In the embodiments of the invention shown in FIGS. 2 and 3, the assembly 250, 350 also comprises a shear pin 214, 314 which is arranged symmetrically on either side of the vertical median plane XZ and thus on each side of the upper longitudinal member 204*a*, 304*a*. Thus a shear pin 214, 314 is present on the port side and a shear pin is present on the starboard side. Each shear pin 214, 314 is also parallel to the longitudinal direction X.

Figure 5:
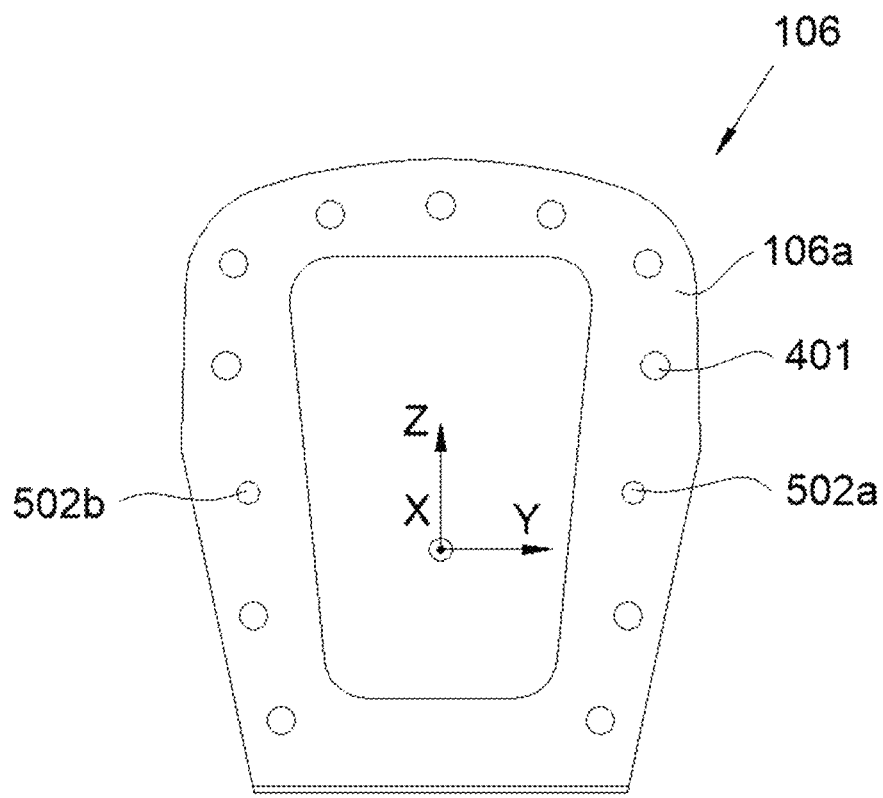
FIG. 5 is a front view of a longitudinal member of a wing of an assembly according to the invention without the engine pylon.

FIG. 5 shows the longitudinal member 106 of the wing 108 and more particularly the contact wall 106*a*. In this embodiment, there are eleven screw-nut systems with three in the region of the upper longitudinal member 204*a*, 304*a* and four for each lateral wall 204*c-d*, 304*c-d*. Each shear pin 214, 314 is inserted into a first hole 502*a-b* of the contact wall 106*a*, namely a first hole 502*a* on the port side and a first hole 502*b* on the starboard side, and a second hole of a lateral wall 204*c-d*, 304*c-d* of the engine pylon 204, 304, here in an angle piece 212, 312 of the lateral wall 204*c-d*, 304*c-d* under consideration. The first hole 502*a-b* and the second hole which are associated with one another here are aligned in the assembled position. The first holes 502*a-b* and the second holes are arranged on either side of the vertical median plane XZ.

Thus one shear pin 214, 314 is inserted into a first hole 502*a* of the contact wall 106*a* and a second hole of a lateral wall 204*c-d*, 304*c-d* and a further shear pin 214, 314 is inserted into a first hole 502*b* of the contact wall 106*a* and a second hole of the other lateral wall 204*d-c*, 304*d-c*.

The shear pins 214, 314 take up the shear forces and the engine torque and are mounted so as to be tightened in the corresponding holes, while the screws 208 are mounted with clearance 411 in the corresponding bores, including the intermediate hole and the intermediate bore 410 described below.

With such an arrangement, in the case of the rupture of a screw-nut system, the other screw-nut systems compensate therefor and ensure the transfer of axial forces, and in the case of the rupture of a shear pin 214, 314, the longitudinal member 106 of the wing 108 and the engine pylon 204, 304 can pivot about the other shear pin 314, 214 and the rotation is stopped by the screw-nut systems which thus transmit the axial forces as well as the shear forces and the engine torque.

In the embodiments of the invention shown in FIGS. 2 and 3, the assembly 250, 350 also comprises an intermediate wall 110 which is arranged between the contact wall 106a and the upper longitudinal member 204a, 304a.

For each screw 208, the intermediate wall 110 is passed through by an intermediate bore 410 which the screw 208 passes through.

When shear pins 214, 314 are present, for each one thereof, the intermediate wall 110 is passed through by an intermediate hole which the shear pin 214, 314 passes through. In the embodiment of the invention shown in FIG. 3 and in FIG. 4, the nut 406 is a barrel nut which is housed in the third bore 308 in order to block the nut in rotation when the screw 208 is tightened.

With this particular arrangement, the thickness of the upper longitudinal member 304a is increased since there is no need to provide space for the angle pieces 210, which makes it possible to optimize the inertia of the engine pylon 304 in order to be able to pass larger forces into the engine pylon 304.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft comprising a wing, said assembly comprising:
a longitudinal member of the wing, wherein the longitudinal member has a contact wall which is penetrated by a plurality of first bores, each passing through the contact wall and parallel to a longitudinal direction of the aircraft perpendicular to the contact wall,
an engine pylon arranged at an end of the longitudinal member in the longitudinal direction of the aircraft, the engine pylon having an upper longitudinal member which is substantially perpendicular to the contact wall and which includes a plurality of second bores which are parallel to the longitudinal direction of the aircraft, such that one of the plurality of second bores is aligned with a corresponding one of the plurality of the first bores, and
a nut and a screw for each pair of corresponding ones of the plurality of first bores and the plurality of second bores which are aligned, wherein each of the screws is screwed into the corresponding nut successively via the first bore and the second bore, sandwiching the upper longitudinal member and the contact wall, and wherein each of the screws is oriented in a direction parallel to the longitudinal direction of the aircraft.

2. The assembly according to claim 1, wherein the engine pylon comprises one lateral wall on each side of the upper longitudinal member and wherein the assembly comprises two shear pins, one of the two shear pins being inserted into one of a plurality of first holes of the contact wall and one of a plurality of second holes disposed on an angled piece which extends radially outwardly from one of the lateral walls, and the other of the two shear pins being inserted into another of the plurality of first holes of the contact wall and a-another of the plurality of second holes disposed on another angled piece which extends radially outwardly from the other of the lateral walls.

3. The assembly according to claim 2, wherein the shear pins are mounted so as to be tightened in the corresponding holes and each of the screws is mounted such that there is a clearance between the screw and the corresponding bores.

4. The assembly according to claim 1, further comprising:
an intermediate wall arranged between the contact wall and the upper longitudinal member,
wherein the intermediate wall includes a plurality of intermediate bores which are aligned with corresponding ones of the plurality of first bores and the plurality of second bores, such that the screw is inserted through one of the plurality of intermediate bores.

5. The assembly according to claim 4, further comprising a shear pin which is passed through an intermediate hole of the intermediate wall.

6. The assembly according to claim 1, wherein the upper longitudinal member includes at least one third bore which is perpendicular to the longitudinal direction, such that a corresponding one of the plurality of second bores opens out into the at least one third bore, and
wherein the nut is a barrel nut housed in the at least one third bore.

7. An aircraft comprising:
the wing and
the assembly according to claim 1.

8. An assembly for an aircraft comprising a wing, said assembly comprising:
a longitudinal member of the wing, wherein the longitudinal member has a contact wall which is penetrated by a plurality of first bores, each passing through the contact wall and parallel to a longitudinal direction of the aircraft perpendicular to the contact wall,
an engine pylon arranged at an end of the longitudinal member in the longitudinal direction of the aircraft, the engine pylon having an upper longitudinal member which is substantially perpendicular to the contact wall and which includes a plurality of second bores which are parallel to the longitudinal direction of the aircraft, such that one of the plurality of second bores is aligned with a corresponding one of the plurality of the first bores, and
a nut and a screw for each pair of corresponding ones of the plurality of first bores and the plurality of second bores which are aligned, wherein the screw is screwed into the nut successively via the first bore and the second bore, sandwiching the upper longitudinal member and the contact wall,
wherein the upper longitudinal member includes at least one third bore which is perpendicular to the longitudinal direction, such that a corresponding one of the plurality of second bores opens out into the at least one third bore, and
wherein the nut is a barrel nut housed in the at least one third bore.

* * * * *